United States Patent Office 2,853,504
Patented Sept. 23, 1958

2,853,504

ALKYLATION OF ORGANOPOLYSILOXANES USING A HYDROCARBON ALUMINUM COMPOUND

Herbert Jenkner, Hannover-Wulfel, Germany, assignor to Kali-Chemie A. G., Hannover, Germany No Drawing. Application May 3, 1956
Serial No. 582,344

Claims priority, application Germany May 5, 1955

2 Claims. (Cl. 260—448.2)

This invention relates to organopolysiloxanes. More particularly, the invention is concerned with the alkylation of such polysiloxanes.

I have discovered that organopolysiloxanes can be alkylated with organo-aluminum compounds. In this way, higher molecular weight organopolysiloxanes may be converted to lower molecular weight organopolysiloxanes, which, however, contain more alkyl groups.

Suitable starting materials for my novel alkylation process are organopolysiloxanes of the formula $(RSiO_{1.5})_x$ or $(R_2SiO)_x$ and mixtures or copolymers thereof, wherein R is a monovalent hydrocarbon radical such as alkyl, aryl, aralkyl, and others.

As organo aluminum components, I use preferably aluminum trialkyls; but other compounds containing at least one Al—C linkage, such as aluminum trialkyl etherates, alkyl aluminum halides, alkyl aluminum alkoxides, may also be used.

The reactions involved may be illustrated by the generic equations:

(1) $(R_2SiO)_x + AlR_3^1 \rightarrow R_2R^1SiO(R_2SiO)_{x-1}AlR_2^1$ (2) $3(R_2SiO)_x + AlR_3^1 \rightarrow [R_2R^1SiO(R_2SiO)_{x-1}]_3Al$ wherein R and $R^1$ are monovalent hydrocarbon radicals as defined above for R, and where $x$ is a whole number larger than 2.

In $R_2$ and $R_2^1$ or $R_3^1$ groups, the individual members of the group may have the same or different composition. The organo-aluminum compound causes in said reaction a split of the —Si—O—Si-linkage—quite stable in other reactions—whereby Al—O bonds are obtained in addition to new Si—C bonds.

In the first stage of the reaction, alkyl aluminum silanolates are formed, which by further alkylation are converted for instance by splitting off Si—O—Si bonds to lower molecular weight organopolysiloxanes containing a higher number of alkyl substituents.

For example, if octamethylcyclotetrasiloxane (x=4) is reacted with an aluminum trialkyl, $AlR_3^1$, the reaction proceeds first essentially as follows:

(3) $AlR_3^1 + [Si(CH_3)_2O]_4 \rightarrow$
$AlR_2^1O[Si(CH_3)_2O]_3SiR^1(CH_3)_2$ whereby the corresponding alkyl aluminum silanolate is formed. On further addition of octamethylcyclotetrasiloxane to the reaction product of Equation 3, pure aluminum trisilanolate of the formula

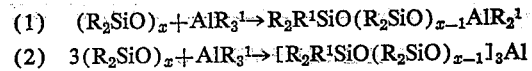

can be obtained. Like all other aluminum alcoholates, said aluminum silanolates are readily hydrolyzed, whereby, besides $Al(OH)_3$, siloxanes having the double number of Si atoms per molecule are obtained by condensation of the silanols first formed by the hydrolysis. In this way, organo polysiloxanes having trialkyl silyl end groups are produced from cyclic organo polysiloxanes.

If the reaction of Equation 3 is carried out with an excess of $AlR_3^1$, a further splitting of the Si—O—Si bonds takes place, for instance according to the following equation.

(4) $AlR_2^1O[Si(CH_3)_2O]_3SiR^1(CH_3)_2 + AlR_3^1 \rightarrow$
$(AlR_2^1O)_2Si(CH_3)_2 +$
$SiR^1(CH_3)_2OSi(CH_3)_2OSi(CH_3)_2R^1$ According to this Equation 4, the recited lower molecular weight organopolysiloxanes containing more alkyl groups $R^1$ are obtained; they may be recovered by distillation, whilst higher molecular weight polysiloxanes containing the original number of organic substituents R (in this case methyl) are formed by hydrolysis of the residual alkyl aluminum silanolate. By varying the ratio of organo polysiloxane to organo aluminum compound, I may readily adjust the extent to which the —Si—O—Si— bonds in the starting linear, cyclic or cross-linked organopolysiloxanes are split up.

If organopolysiloxanes of the formula $(RSiO_{1.5})_x$ are alkylated with organo aluminum compounds, the reactions proceed through the stage of the diorgano-substituted polysiloxanes basically in the same manner as set forth above.

Generally the reaction can be carried out without solvents and catalysts at ordinary pressure up to temperatures of about 250° C. Of course, it is also possible to work at higher pressures, or to use solvents or catalysts, such as boron alkyls, zinc alkyls, cadmium alkyls, zinc alkyl halides, and the like.

If the organo aluminum compound contains in addition to the Al—C-linkages, other linkages as for instance Al-halogen linkages in organo aluminum halides, Si—halogen bonds are produced in addition to the newly formed —Si—C-bonds which opens up a wide field of variations.

The following examples are merely illustrative of the invention and are not to be construed as limiting the scope thereof. Applying the principle of the alkylation of organopolysiloxanes with organo aluminum compounds according to the invention, the skilled in the art will easily be able to react other combinations of compounds of the type involved.

All parts are given by weight.

Example 1

978 parts of a dimethyl polysiloxane ($b_{0.01}$# > 200° C. oilbath) were mixed with a total of 464 parts of triethyl aluminum. After 5 hours heating time at 170° C., 45 percent of the aluminum triethyl had reacted; when the heating was continued at 190° C. for 8 more hours, more than 77 percent of the aluminum triethyl had entered into reaction.

The reaction mixture was then poured into dilute HCl and shaken out with ether; the ether layer was washed and subsequently dried with sodium sulfate, and distilled. After removal of the ether, the following fractions were obtained.

| | Percent |
|---|---|
| $b_{21}$, up to 93° C | 34 |
| $b_{21}$, 95–115° C | 17 |
| $b_{17}$, 115–150° C | 32 |
| $b_{17}$, 150–180° C | 10 |
| $b_{17}$, 180–205° C | 5 |
| Residue | 2 |

The total yield was 960 parts. 98 percent of the high molecular weight dimethyl polysiloxane used as starting material had been converted to lower molecular weight ethylmethyl polysiloxanes (or silanols, respectively).

Example 2

465 parts of a mixture of hexamethyl cyclo trisiloxane and octamethyl cyclo tetrasiloxane ($b_{12}$=60 to 70° C.) were heated with a total amount of 240 parts of aluminum triethyl for a period of 7 hours at a temperature of 220-250° C. At the end of the reaction period 84 percent of the aluminum triethyl had reacted, and 6 percent had been thermally decomposed.

The obtained product was then distilled, without hydrolysis. 32 parts were distilled off at a pressure of 12 mm. Hg in the temperature range of 50 to 115° C. The residue contained 35 parts of the obtained aluminum silanolate, which represented at room temperature a yellowish readily hydrolyzable resin.

*Example 3*

48.5 parts of methyl polysiloxane (RSiO$_{1.5}$ prepared from sodium methylsiliconate solution) were dried for 2 hours at 200° C. in vacuo, and subsequently a total of 190 parts of aluminum triethyl, which is a large excess, were added to the dried product with stirring. On heating at 140-160° C., the initially viscous pulpy mass was converted within 35 minutes to a mobile still cloudy liquid. In order to complete the reaction, heating at 170-175° was continued for further 12 hours, and the obtained product was processed as set forth in Example 1. 35 parts of liquid polysiloxane were obtained, which distilled at a pressure of 14 mm. Hg between 60 and 80° C.

*Example 4*

20 parts of aluminum triethyl were added dropwise to 36 parts of an unmeltable elastic dimethyl polysiloxane gel at 150° C. on an oilbath. After 30 minutes, the gel was already completely liquefied. Nevertheless, heating at 160° C. was continued for 6 hours. The conversion, calculated on aluminum triethyl, was 85 percent after 6 hours.

The obtained mixture was treated as discribed in Example 1 and yielded on distillation at 18 mm. Hg the following fractions:

| | Percent |
|---|---|
| Below 35° C | 14 |
| 35-45° C | 15 |
| 65-95° C | 24 |
| 95-140° C | 47 |

The aluminium silanolates prepared according to the invention are readily hydrolized with water or with diluted acids such as hydrochloric acid, sulfuric acid, and also by alkaline solutions such as sodium hydroxide; as solvents for the split off polysiloxanes I may use ethyl ether, benzene, toluene and the like.

Further organo-aluminum compounds which are useful for the purpose of this invention are: aluminum trimethyl, aluminum tripropyl, aluminum trihexyl, aluminum tricyclohexyl, aluminum ethyl halide, aluminum triphenyl.

I claim:

1. A method of alkylating methyl polysiloxanes comprising heating a methyl polysiloxane with a tri-monovalent hydrocarbon aluminum compound wherein said hydrocarbon groups are lower aliphatic radicals, at a temperature of about 100° to 250° C. for a time sufficient to attach siloxane groups of said polysiloxane through their oxygen atoms to the aluminum, hydrolyzing the obtained aluminum silanolate, thereby obtaining an at least partially alkylated polysiloxane, extracting said partially alkylated polysiloxane in an organic solvent, and separating said solvent and polysiloxane by distillation.

2. A method of ethylating methyl polysiloxanes comprising heating a methyl polysiloxane with aluminum triethyl at a temperature of about 100° to 250° C. for a time sufficient to attach siloxane groups of said polysiloxane through their oxygen atoms to the aluminum, hydrolyzing the obtained aluminum silanolate, thereby obtaining an at least partially ethylate polysiloxane, extracting said partially ethylated polysiloxane in an organic solvent, and separating said solvent and polysiloxane by distillation.

References Cited in the file of this patent

UNITED STATES PATENTS

| 2,645,654 | Hyde | July 14, 1953 |

FOREIGN PATENTS

| 888,852 | Germany | Sept. 7, 1953 |
| 908,019 | Germany | Apr. 1, 1954 |